(12) United States Patent
Jaeger et al.

(10) Patent No.: US 9,791,332 B2
(45) Date of Patent: Oct. 17, 2017

(54) ROD-SHAPED FORCE TRANSDUCER WITH IMPROVED DEFORMATION BEHAVIOR

(71) Applicant: Hottinger Baldwin Messtechnik GmbH, Darmstadt (DE)

(72) Inventors: Andreas Jaeger, Brombachtal (DE); Heinz-Ronald Will, Alsbach-Haehnlein (DE); Werner Schlachter, Rossdorf (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 0 days.

(21) Appl. No.: 14/907,709

(22) PCT Filed: Jul. 28, 2014

(86) PCT No.: PCT/DE2014/000391
§ 371 (c)(1),
(2) Date: Feb. 24, 2016

(87) PCT Pub. No.: WO2015/010684
PCT Pub. Date: Jan. 29, 2015

(65) Prior Publication Data
US 2016/0161349 A1   Jun. 9, 2016

(30) Foreign Application Priority Data
Jul. 26, 2013  (DE) ................. 10 2013 012 506

(51) Int. Cl.
*G01D 7/00* (2006.01)
*G01L 1/22* (2006.01)
*G01G 3/14* (2006.01)

(52) U.S. Cl.
CPC ............. *G01L 1/22* (2013.01); *G01G 3/141* (2013.01); *G01G 3/1408* (2013.01); *G01L 1/2218* (2013.01); *G01L 1/2231* (2013.01)

(58) Field of Classification Search
CPC ....... G01L 1/22; G01L 1/2218; G01L 1/2231; G01G 3/1408; G01G 3/141
(Continued)

(56) References Cited

U.S. PATENT DOCUMENTS 3,927,560 A * 12/1975 Farr ................. G01L 1/2243
                                                   177/211
4,733,571 A *  3/1988 Ormond ............... G01L 1/2218
                                                   338/5

(Continued)

FOREIGN PATENT DOCUMENTS

DE       44 16 442       11/1995
EP       0 800 064       10/1997
(Continued)

OTHER PUBLICATIONS

International Search Report of the International Searching Authority for International Application PCT/DE2014/000391, dated Dec. 11, 2014, 3 pages, European Patent Office, HV Rijswijk, Netherlands.
(Continued)

*Primary Examiner* — Max Noori
(74) *Attorney, Agent, or Firm* — W. F. Fasse

(57) ABSTRACT

A force transducer for measuring compression and/or tension forces includes a rod-shaped deformation body and at least four strain transducers applied on the deformation body and configured for measuring longitudinal and transverse strains thereof. Front and rear elongate recesses are provided on the front and rear sides of the deformation body in the area of an intersection between a central longitudinal axis and a central transverse axis of the deformation body. Left and right upper indentations and left and right lower indentations are provided on the deformation body respectively at the four quadrants bounded by the axes. A ratio of a cross-section on a center plane extending orthogonally to the central longitudinal axis and including the central transverse (Continued)

axis, to a sum of first and second partial regions of the cross-section, is from 1.56 to 2.15.

19 Claims, 5 Drawing Sheets

(58) Field of Classification Search
USPC .................................. 73/862.041–862.046
See application file for complete search history.

(56) References Cited

U.S. PATENT DOCUMENTS

| | | | | |
|---|---|---|---|---|
| 5,201,218 | A * | 4/1993 | Mole | G01M 9/062 338/2 |
| 5,679,882 | A | 10/1997 | Gerlach et al. | |
| 6,253,626 | B1 * | 7/2001 | Shoberg | G01L 5/161 73/775 |
| 6,983,643 | B2 * | 1/2006 | Brighton | G01N 3/08 73/81 |
| 8,297,115 | B2 * | 10/2012 | Borgers | G01L 23/18 73/114.19 |
| 2004/0106460 | A1 * | 6/2004 | Lee | A63B 24/0003 473/219 |
| 2005/0081652 | A1 | 4/2005 | Scott et al. | |
| 2011/0088489 | A1 * | 4/2011 | Yamamoto | G01L 1/2218 73/862.627 |
| 2016/0161348 | A1 | 6/2016 | Jaeger et al. | |

FOREIGN PATENT DOCUMENTS

| | | |
|---|---|---|
| GB | 2 162 322 | 1/1986 |
| WO | WO 01/18504 | 3/2001 |

OTHER PUBLICATIONS

English Translation of PCT Written Opinion of the International Searching Authority for International Application PCT/DE2014/000391, dated Dec. 11, 2014, 15 pages, European Patent Office, HV Rijswijk, Netherlands.

* cited by examiner

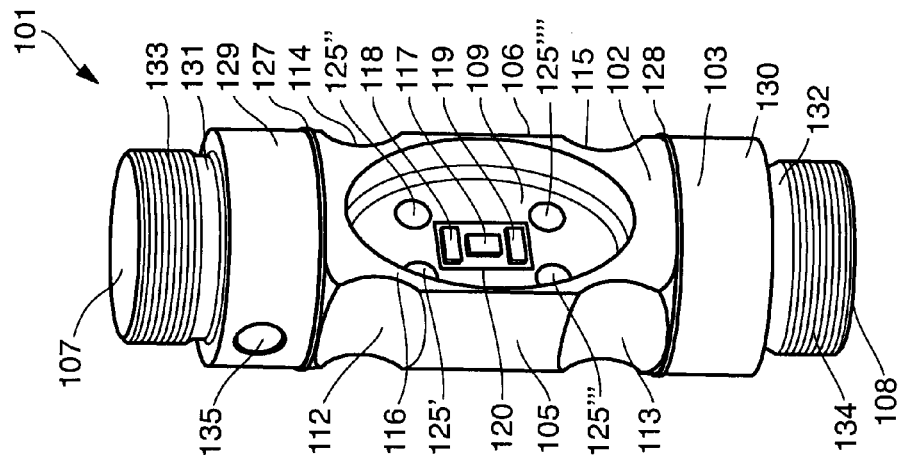
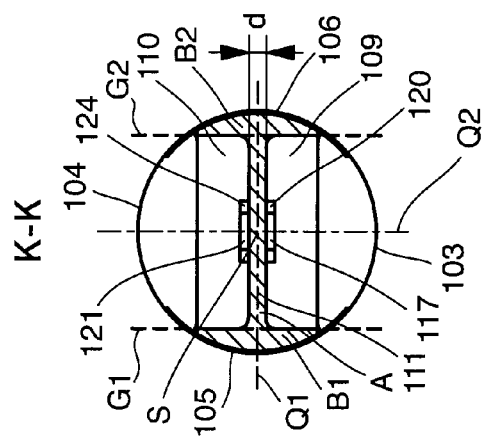
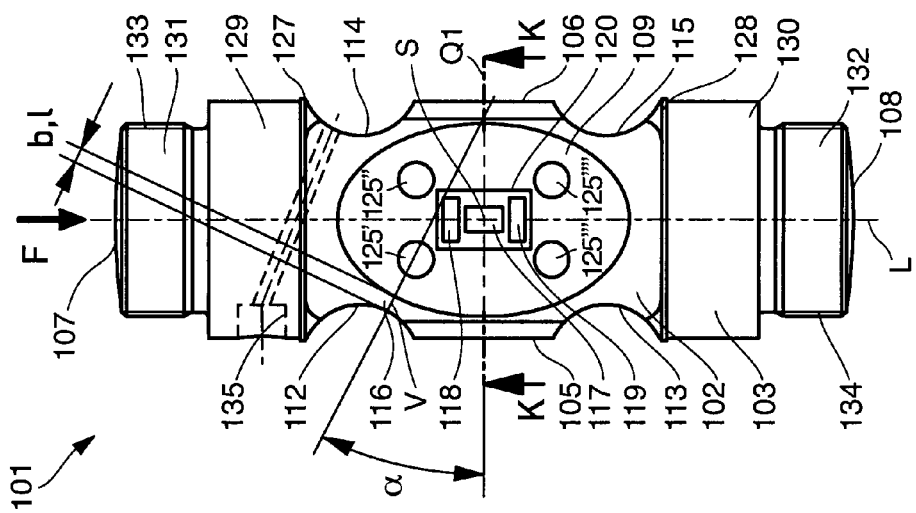

ROD-SHAPED FORCE TRANSDUCER WITH IMPROVED DEFORMATION BEHAVIOR

FIELD OF THE INVENTION

The present invention relates to a rod-shaped force transducer, of which the deformation behavior is better than that of known rod-shaped force transducers.

BACKGROUND INFORMATION

Rod-shaped force transducers are known, in which a longitudinal strain and a transverse strain of a rod-shaped measuring body or deformation body are detected, respectively with the aid of strain transducers applied on the deformation body. From the electrical signals produced by the strain transducers, based thereon a force to be measured can be determined. When they are provided for the construction of weighing scales, such force transducers are also referred to as load cells or weighing cells.

For a rod-shaped force transducer of the described type, a costly or time-consuming compensation adjustment is necessary, which is also referred to as a rotation compensation. Thereby, tolerances of the deformation body or of the strain transducers that arise due to the production are to be counteracted, and the force transducer is to be made less sensitive to lateral or transverse force influences and therewith also to changes in the force introduction.

The rotation compensation is carried out as follows. One end of the rod-shaped force transducer is clamped into a support or holding device. At its other end, the force transducer is loaded by a loading device. This process is repeated for another three times after a respective rotation of the holding device together with the clamped-in force transducer by 90°. From the measured values of the force transducer in the various different rotational positions, a conclusion is reached whether a compensation is necessary. If that is the case, then the force transducer is again rotated several times and a mechanical compensation by material removal and/or an electrical compensation is carried out. Alternatively, the compensation can also be carried out in that not the force transducer but rather the loading device is rotated. In this case, several material removal devices or a rotatable material removal device are necessary for the mechanical compensation.

The rotational compensation always requires several rotations and loadings. Therefore carrying out the rotational compensation is costly or time-consuming.

In the EP 0 800 064 B1, a rod-shaped force transducer of the above described type is explained, and the rotational compensation carried out for it is mentioned. In the DE 44 16 442 A1, the rotational compensation is described in further detail.

Even after such a rotational compensation, the danger of a falsification of the measurement results still exists due to the following effect. If a force is introduced not fully coaxially to the longitudinal axis of the rod-shaped embodied deformation body, via the force introduction surfaces on the end face ends of the deformation body, and/or additional transverse forces are effective, then the deformation body becomes deformed in the direction transverse to the longitudinal axis, not uniformly, but rather in a one-sided manner. In other words, the deformation body tilts toward one side and becomes deformed non-coaxially to its longitudinal axis, whereby the lines of force no longer extend in the desired manner. This leads to a falsification of the measurement results.

Besides the rotational compensation, e.g. also a temperature compensation is carried out, so that in total several compensation measures must be carried out for the known rod-shaped force transducers of the above described type.

A rod-shaped force transducer with a cylindrical compression body is also known from the GB 2 162 322 A, in which a force to be detected bears upon the end faces of the compression body. It comprises two elongated holes that are oriented longitudinally along the force direction and lie opposite one another, of which the base surfaces form a web onto which strain gages arranged longitudinally and transversely to the force direction are applied. The web comprises a through-going bored hole respectively in front of and behind the strain gages in the force direction. Necessitated by the two bored holes, under the influence of a force, the lines of force extend past the bored holes laterally next to the two bored holes. Thereby, the force line distribution in the middle of the compression body, where the strain gages are located, also becomes increasingly inhomogeneous. The larger the diameter of the two bored holes, and the smaller the spacing distance of the bored holes from the strain gages, the fewer the force lines that will extend through the area of the web lying between the strain gages. The sensitivity of the force transducer can be increased in that the two elongated holes are made deeper and/or wider. It can be reduced in that the diameter of the two bored holes is increased.

In the force transducer described in this GB 2 162 322, the measuring behavior is influenced by material removal in order to enlarge the measuring range with a linear characteristic curve. Thereby the sensitivity of the force transducer is increased, in that the two elongated holes are made deeper and/or wider, and is reduced in that the diameter of the two bored holes is increased. In this manner the measuring range with a linear characteristic curve is to be adjusted very exactly. This is an iterative and costly or time-consuming process.

SUMMARY OF THE INVENTION

In view of the above, it is an object of at least one embodiment of the invention to provide a force transducer in which a one-sided deformation of its deformation body can be avoided, and which thereby operates highly linearly and provides very accurate measurement results even without costly and time-consuming measures like those described above.

This object can be achieved with a force transducer according to at least one embodiment of the invention as set forth herein.

According to a first aspect of at least one embodiment of the invention, a force transducer for measuring compression and/or tension forces comprises a rod-shaped deformation body, which comprises at least a front side, a rear side, a left side, a right side, an upper end face and a lower end face, and at least four strain transducers that are applied on the deformation body and are configured and set-up for measuring a longitudinal strain and a transverse strain of the deformation body. On the front side, a front elongate recess is provided in the area of an intersection point between a central longitudinal axis and a central transverse axis of the deformation body. Lying opposite the front elongate recess, a rear elongate recess is provided on the rear side. On the left side, at least a left upper indentation is provided above the central transverse axis and a left lower indentation is provided below the central transverse axis. Respectively lying opposite these indentations on the left side, at least a right upper indentation and a right lower indentation are provided on the right side. A material cross-section of the deformation body in a center plane extending orthogonally to the central longitudinal axis and including the central transverse axis comprises a material cross-section surface area. A left first partial region of the material cross-section extends from a left first line, which extends through an edge or rim of the front elongate recess toward the left side and an edge or rim of the rear elongate recess toward the left side, out to an edge of the material cross-section toward the left side. The first partial region comprises a first partial region surface area. A right second partial region of the material cross-section extends from a right second line, which extends through an edge or rim of the front elongate recess toward the right side and an edge or rim of the rear elongate recess toward the right side, out to an edge of the material cross-section toward the right side. The second partial region comprises a second partial region surface area. A relationship or ratio between the material cross-section surface area and a sum of the first partial region surface area and the second partial region surface area is not smaller than 1.56 and not larger than 2.15.

The special configuration of the deformation body with the elongate recesses on its front and rear side, the indentations on its left and right side, as well as the particular surface relationship of its material cross-section leads to a result that the deformation body expands or dilates symmetrically toward the left side and toward the right side under the influence of a compression force to be measured. Under the influence of a tension force to be measured, it correspondingly contracts symmetrically from the left side and from the right side. This pertains respectively also for a force that acts not totally coaxially and/or under the influence of additional transverse forces.

The symmetrical deformation is achieved in that respectively only a very thin web remains between the elongate recesses and the indentations, which are arranged in a very particular manner. Thereby, a type of "hinge joint action" is achieved. In cooperation with the special surface relationship of the material cross-section, this leads to the especially symmetrical deformation.

Consequently, the rod-shaped force transducer comprises a better deformation behavior than known rod-shaped force transducers. Thereby, it comprises a high linearity and measurement accuracy, which are completely sufficient for normal requirements of measurement accuracy. This always pertains independently of the nominal or rated load of the force transducer, if the above described characteristic features are present.

According to a second aspect, an angle between the central transverse axis and a shortest connecting line between the front elongate recess and the left upper indentation is not smaller than 17° and not larger than 29°.

If the angle between the central transverse axis and the shortest connecting line is not smaller than 17° and not larger than 29°, then the described "hinge joint effect" arises especially clearly. This pertains independently of a nominal load of the force transducer.

Thus, the force transducer is insensitive to interfering force influences after its production even without a mechanical compensation through material removal and/or electrical compensation for compensating production-necessitated tolerances in the deformation body or the strain transducers, especially without a rotational compensation. Thereby, a costly or time-consuming compensation measure can be omitted, and the force transducer can be compensated more easily.

According to a third aspect, the elongate recesses are respectively embodied essentially ellipse shaped.

With an ellipse shaped or approximately ellipse shaped configuration of the elongate recesses, they are embodied convex everywhere. If the indentations are similarly embodied convex everywhere, then there is respectively exactly one thinnest location between recess and indentation. This advantageously influences the symmetrical deformation of the deformation body both under the influence of a compression force to be measured as well as under the influence of a tension force to be measured. Moreover, the essentially ellipse shaped elongate recesses can be readily produced with a rotationally symmetrical tool.

According to a fourth aspect, the indentations are respectively embodied essentially partial circle shaped.

With a partial circle shaped or approximately partial circle shaped configuration of the indentations, they are embodied convex everywhere. If the elongate recesses are similarly embodied convex everywhere, then there is respectively exactly one thinnest location between recess and indentation. This again in turn advantageously influences the symmetrical deformation of the deformation body both under the influence of a compression force to be measured as well as under the influence of a tension force to be measured. Moreover, the essentially partial circle shaped indentations can be readily produced with a rotationally symmetrical tool.

According to a fifth aspect, the front elongate recess and the rear elongate recess are respectively arranged centered with respect to the intersection point. Moreover, the left upper indentation and the left lower indentation as well as the right upper indentation and the right lower indentation are respectively arranged symmetrically with respect to the central transverse axis.

The centered arrangement of the elongate recesses and the symmetrical arrangement of the indentations lead to the result that the force lines of a compression force or tension force to be measured are distributed uniformly in the deformation body. Thereby the deformation body is also deformed uniformly.

According to a sixth aspect, at least four front recesses are provided in the front elongate recess, and respectively lying opposite these, at least four rear recesses are provided in the rear elongate recess, wherein this may respectively involve through-going or non-through-going recesses.

The symmetrical deformation of the deformation body in the desired manner is supported by the front and rear recesses.

According to a seventh aspect, during a force measurement, the relationship or ratio between the transverse strain and the longitudinal strain lies between 55% and 72%.

With this relationship between the transverse strain and the longitudinal strain, which significantly deviates from the typical relationship between the transverse strain and the longitudinal strain of approximately 30% for force transducers consisting of metal, for example the force transducer described in the EP 0 800 064, the best measurement results are achieved with the special configuration of the deformation body.

According to an eighth aspect, at least three front strain transducers are arranged in the front elongate recess, and at least three rear strain transducers are arranged in the rear elongate recess. One of the front strain transducers and one of the rear strain transducers is arranged centered with respect to the intersection point, and is configured and set-up for measuring the longitudinal strain. Two of the front strain transducers and two of the rear strain transducers are arranged symmetrically with respect to the central transverse axis, above and below the same, and are configured and set-up for measuring the transverse strain.

Through the centering, with respect to the intersection point, of the strain transducers for measuring the longitudinal strain, these are respectively arranged at the location where they provide the best measurement results. The symmetrical arrangement of respectively two front and rear strain transducers for the transverse strain makes it possible to compensate deviations of their measurement results that are caused or necessitated by the off-center arrangement of these strain transducers.

According to a ninth aspect, the deformation body is embodied symmetrically with respect to a first plane formed by the central longitudinal axis and the central transverse axis. Additionally, at least in an area in which the front elongate recess, the rear elongate recess and the indentations are located, the deformation body is configured symmetrically also with respect to a second plane that extends orthogonally to the central transverse axis and includes the central longitudinal axis, and is configured symmetrically with respect to the center plane.

The very predominantly symmetrical configuration of the deformation body advantageously influences its symmetrical deformation.

According to a tenth aspect, the deformation body consists of steel, titanium, aluminum or beryllium copper.

The abovementioned metals comprise material characteristics and especially transverse contraction values that make the desired deformation behavior of the deformation body possible.

BRIEF DESCRIPTION OF THE DRAWINGS

The invention will be explained in further detail in the following based on example embodiments in connection with schematic drawings. It is shown by:

FIGS. 1a, 1b and 1c a force transducer 101 according to a first example embodiment;

DETAILED DESCRIPTION OF EXAMPLE EMBODIMENTS OF THE INVENTION

Figure 2C:
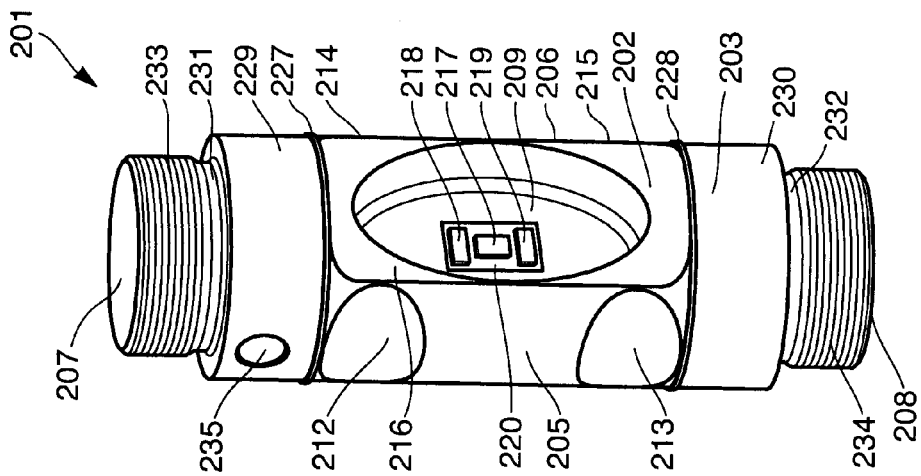
FIGS. 2a, 2b and 2c a force transducer 201 according to a second example embodiment.

FIG. 1a shows a front view of the force transducer 101 according to the first example embodiment, FIG. 1b shows a section K-K through the force transducer 101, and FIG. 1c shows a perspective view of the force transducer 101.

The force transducer 101 encompasses a rod-shaped deformation body 102 of a material such as, for example, steel, titanium, aluminum or beryllium copper. It can be machined out of a rod with a circular, quadratic or other cross-section, e.g. from a piece of round steel or square steel stock. The following description starts from the assumption that the deformation body is based on a cylindrical rod and itself has a cylindrical basic shape as shown in the drawings. However, other variants are also possible, in which the deformation body 102 can then also comprise more sides than the sides described in the following.

The deformation body 102 comprises a central longitudinal axis L, which extends vertically in the front view illustrated in FIG. 1a. It also comprises a first central transverse axis Q1, which is arranged orthogonally to the central longitudinal axis L and extends horizontally in the front view illustrated in FIG. 1a. A second central transverse axis Q2 of the deformation body 102, which is arranged orthogonally to the central longitudinal axis L and the first central transverse axis Q1, would extend into the illustration plane in the front view illustrated in FIG. 1a, and is shown in FIG. 1b. The central longitudinal axis L as well as the two central transverse axes Q1 and Q2 all extend through a common intersection point S, and respectively orthogonally relative to one another. They form three planes that similarly extend respectively orthogonally relative to one another. The force transducer 101 and its deformation body 102 are predominantly symmetrical with respect to each one of the three planes formed or spanned by the central longitudinal axis L as well as the two central transverse axes Q1 and Q2, which is explained in further detail in the following.

The deformation body 102 comprises a front side 103, which is frontally shown in the front view illustrated in FIG. 1a. It also comprises a rear side 104 that is not completely visible in the drawings, and that is illustrated at least in cross-section in FIG. 1b. It is symmetrical to the front side 103 illustrated in FIG. 1a, and looks like it in a frontal illustration. In other words, the rear side 104 could also be shown in a frontal illustration in FIG. 1a, if it would be provided with different reference numbers. The deformation body 102 furthermore comprises a left side 105 located to the left in FIG. 1a, a right side 106 located to the right in FIG. 1a, an upper end face 107 located at the top in FIG. 1a, and a lower end face 108 located at the bottom in FIG. 1a.

The upper end face 107 and the lower end face 108 respectively form a force introduction surface, through which a force F to be measured or respectively a corresponding counter force can be introduced. The upper end face 107 and the lower end face 108 are preferably spherical and embodied centered with respect to the central longitudinal axis L. The upper end face 107 or the lower end face 108 can, however, also be embodied planar for example. It is also possible that both the upper end face 107 as well as the lower end face 108 are embodied planar.

As is indicated in FIG. 1b and readily recognizable in FIG. 1c, when the deformation body 102 was being machined out of the cylindrical rod on which it is based, material was removed from the front and rear in its middle or central area in the longitudinal direction, so that the front side 103 and the rear side 104 are respectively flattened or embodied planar in this central area. At the upper and lower end of the deformation body 102, the cylindrical basic shape was respectively retained, however the diameter was changed in several steps, which will still be described in further detail below.

As can be seen especially well in FIG. 1a and FIG. 1c, on its front side 103 the deformation body 102 comprises a front elongate recess 109, which extends in the flattened area of the front side 103 in the direction of the central longitudinal axis L of the deformation body 102 that extends through the upper end face 107 and the lower end face 108. At its upper end and its lower end, it still comprises a significant spacing distance to the edge of the flattened area of the front side 103, while it ends shortly before this edge at its left end and its right end. Expressed differently, the major axis of the front elongate recess 109 extends in the direction of the central longitudinal axis L and its minor axis extends in the direction of the first central transverse axis Q1, whereby its major apexes form its upper and lower end and its minor apexes form its left and right end.

On its rear side 104, the deformation body 102 comprises a rear elongate recess 110, which is not completely visible in the drawings, but is illustrated at least in cross-section in FIG. 1b. It lies opposite the front elongate recess 109, comprises the same shape as it, and is located in the flattened area of the rear side 104. In other words, the rear elongate recess 110 could also be shown in FIG. 1a and FIG. 1c, if they would be provided with different reference numbers.

The two elongate recesses 109 and 110 are respectively located in the middle or center of the deformation body 102, that is to say in the area of the intersection point S between the central longitudinal axis L, the first central transverse axis Q1 extending from the left side 105 to the right side 106, and the second central transverse axis Q2 extending from the front side 103 to the rear side 104. Stated more exactly, the two elongate recesses 109 and 110 are respectively arranged centered with respect to the intersection point S. Each one of the elongate recesses 109 and 110 is preferably embodied ellipse shaped. However, other elongated shapes, such as for example an elongated or slotted hole shape or the shape described below in connection with the fifth example embodiment, are also possible.

As can be readily recognized in FIG. 1b, a central web 111 remains between the front elongate recess 109 and the rear elongate recess 110, on which web strain transducers are applied as will be explained in further detail below. A base surface at the bottom end of the front elongate recess 109 and a base surface at the bottom end of the rear elongate recess 110, which respectively form one side of the central web 111, are preferably plane-parallel.

A depth of the elongate recesses 109 and 110, and therewith a thickness d of the central web 111 remaining between them, are selected with consideration of the nominal or rated load for which the force transducer 101 is designed. The first example embodiment starts from the assumption of a relatively low nominal load such as for example 7,500 kg, so that the thickness d of the central web 111 is comparatively small in this case. With higher nominal loads, the thickness d is correspondingly larger, in order to satisfy the then higher demands on the stability of the deformation body 102.

In the section K-K through the force transducer 101 shown in FIG. 1b, a material cross-section A of the deformation body 102 is illustrated with hatch lines. The section K-K through the force transducer 101 and therewith also the material cross-section A of the deformation body 102 extend in a center plane of the deformation body 102 or of the force transducer 101 extending orthogonally to the central longitudinal axis L and including the first central transverse axis Q1. A surface area of the material cross-section A is referred to as a material cross-section surface area in the following.

A straight line located on the left i.e. a left first line G1, which is visualized by a dashed line in FIG. 1b, extends through a left edge or rim of the front elongate recess 109 and a left edge or rim of the rear elongate recess 110, or represents an extension of these edges or rims, in a region of the section K-K located to the left in FIG. 1b. The left edge or rim of the front elongate recess 109 and the left edge or rim of the rear elongate recess 110 respectively involves the edge or rim of the elongate recess toward the left side 105 of the deformation body 102.

A straight line located on the right i.e. a right second line G2, which is similarly visualized by a dashed line in FIG. 1b, extends through a right edge or rim of the front elongate recess 109 and a right edge or rim of the rear elongate recess 110, or represents an extension of these edges or rims, in a region of the section K-K located to the right in FIG. 1b. The right edge or rim of the front elongate recess 109 and the right edge or rim of the rear elongate recess 110 respectively involves the edge or rim of the elongate recess toward the right side 106 of the deformation body 102.

A partial region located on the left i.e. a left first partial region B1 of the material cross-section A is that partial region of the material cross-section A that is located to the left next to the left first line G1 in FIG. 1b and extends out to a left edge or rim of the deformation body 102 or of the material cross-section A. In other words, the left first partial region B1 extends from the left first line G1 out to the edge or rim of the material cross-section A toward the left side 105 of the deformation body 102. A surface area of the left first partial region B1 is referred to as the first partial region surface area in the following.

A partial region located on the right i.e. a right second partial region B2 of the material cross-section A is that region of the material cross-section A that is located to the right next to the right second line G2 in FIG. 1B and extends out to a right edge or rim of the deformation body 102 or of the material cross-section A. In other words, the right second partial region B2 extends from the right second line G2 out to the edge or rim of the material cross-section A toward the right side 106 of the deformation body 102. A surface area of the right second partial region B2 is referred to as the second partial region surface area in the following.

The material cross-section A and its two partial regions B1 and B2 are in a special size relationship or ratio to each other. Stated more exactly, a relationship or ratio between the material cross-section surface area and a sum of the first partial region surface area and the second partial region surface area amounts to between 1.56 and 2.15, that is to say, is not smaller than 1.56 and not larger than 2.15.

As is readily recognizable in FIG. 1a and FIG. 1c, on its left side 105 the deformation body 102 comprises a left upper groove or indentation 112, which is located above the first central transverse axis Q1, and a left lower groove or indentation 113, which is located below the first central transverse axis Q1. Furthermore, on the right side 106 of the deformation body 102, there are provided a right upper groove or indentation 114, which is located above the first central transverse axis Q1 and lies across from the left upper indentation 112, and a right lower groove or indentation 115, which is located below the first central transverse axis Q1 and lies across from the left lower indentation 113. Variants with more than two indentations per side are also conceivable.

The left indentations 112 and 113 both comprise the same spacing distance to the first central transverse axis Q1 or to the plane formed by it and the second central transverse axis Q2, that is to say they are symmetrically arranged with respect to the first central transverse axis Q1 or this plane. The same also pertains for the right indentations 114 and 115. Each one of the indentations 112, 113, 114 and 115 is preferably embodied partial circle shaped, but may also comprise a different shape such as for example that of a section of an ellipse. In the force transducer 101 according to the first example embodiment, each one of the indentations 112, 113, 114 and 115 extends into the flattened area of the front side 103 and the flattened area of the rear side 104.

Between the front elongate recess 109 and the indentations 112, 113, 114 and 115, just like between the rear elongate recess 110 and the indentations 112, 113, 114 and 115, there respectively remains a web, which comprises the width b at its thinnest location. This is illustrated in FIG. 1 by example for the front elongate recess 109, the left upper indentation 112 and the web 116 therebetween, but also pertains correspondingly for the other indentations 113, 114 and 115 as well as for the rear elongate recess 110, due to the substantially symmetrical configuration of the deformation body 102. In other words, there is respectively a web between the front elongate recess 109 and each one of the indentations 112, 113, 114 and 115 as well as between the rear elongate recess 110 and each one of the indentations 112, 113, 114 and 115, wherein the respective web comprises a width b at its thinnest location.

If the front elongate recess 109 and the rear elongate recess 110 are embodied strictly convex or everywhere convex, that is to say for example if they are ellipse shaped as described above, and the indentations 112, 113, 114 and 115 are similarly configured strictly convex or everywhere convex, that is to say for example partial circle shaped as described above, then there is exactly one thinnest location present respectively between one of the elongate recesses 109 and 110 as well as one of the indentations 112, 113, 114 and 115, at which thinnest location the respective web comprises the width b. Thus there is respectively exactly one shortest connecting line with a length l, which is equal to the width b of the web, between elongate recess and indentation. For example, as shown in FIG. 1a, there exists a shortest connecting line V with the length l between the front elongate recess 109 and the left upper indentation 112.

An angle α between the first central transverse axis Q1 and the shortest connecting line V with the length l between the front elongate recess 109 and the left upper indentation 112 or an extension of this shortest connecting line V as shown in FIG. 1a amounts to between 17° and 29°, that is to say is not smaller than 17° and not larger than 29°. Due to the largely symmetrical configuration of the deformation body 102, this correspondingly also pertains for the rear elongate recess 110 as well as the other indentations 113, 114 and 115.

As shown in FIG. 1a and FIG. 1c, a front center strain transducer 117, a front upper strain transducer 118 and a front lower strain transducer 119, which can be realized on a common carrier or on separate carriers, are applied on the front side 103 of the deformation body 102. In FIG. 1a and FIG. 1c, the variant with a front common carrier 120 is illustrated. A common carrier achieves the advantages described in the EP 0 800 064, such as for example lower production costs, a lower circuit complexity, and a simplified application.

The front common carrier 120 or respectively the front strain transducers 117, 118 and 119 are arranged in the front elongate recess 109. The front center strain transducer 117 is configured and set-up for measuring a longitudinal strain of the deformation body 102 arising in the direction of the central longitudinal axis L, and is arranged centered with respect to the intersection point S. The front upper strain transducer 118 and the front lower strain transducer 119 are, in contrast, configured and set-up for measuring a transverse strain of the deformation body 102 arising in the direction of the first central transverse axis Q1, are positioned centered with respect to the central longitudinal axis L, and are arranged symmetrically with respect to the first central transverse axis Q1 or the plane formed by it and the second central transverse axis Q2, that is to say with the same spacing distance relative to them, above and below the first central transverse axis Q1 or this plane.

A rear center strain transducer 121, a rear upper strain transducer 122 and a rear lower strain transducer 123, which are not visible in FIG. 1a and FIG. 1c and only partially visible in FIG. 1b, are applied on the rear side 104 of the deformation body 102. They correspond to the front strain transducers 117, 118 and 119 and respectively lie opposite these. They can similarly be realized on a common carrier or separate carriers, whereby here one proceeds from a rear common carrier 124 that is not visible in FIG. 1a and FIGS. 1c and 1s visible in cross-section in FIG. 1b. Thus, correspondingly, in FIG. 1a and FIG. 1c, the three rear strain transducers 121, 122 and 123 as well as their rear common carrier 124 could also be shown, if they would be provided with other reference numbers.

Thus, the rear common carrier 124 or the rear strain transducers 121, 122 and 123 are arranged in the rear elongate recess 110 and respectively opposite the front common carrier 120 or the front strain transducers 117, 118 and 119. Just like the front center strain transducer 117, the rear center strain transducer 121 is configured and set-up for measuring the longitudinal strain of the deformation body 102 arising in the direction of the central longitudinal axis L, and is arranged centered with respect to the intersection point S. In contrast, just like the front strain transducers 118 and 119, the rear upper strain transducer 122 and the rear lower strain transducer 123 are configured and set-up for measuring the transverse strain of the deformation body 102 arising in the direction of the first central transverse axis Q1, are positioned centered with respect to the central longitudinal axis L, and are arranged symmetrically with respect to the first central transverse axis Q1 or the plane formed by it and the second central transverse axis Q2, that is to say with the same spacing distance relative to them, above and below the first central transverse axis Q1 or this plane.

The strain transducers 117, 118, 119, 121, 122 and 123 can involve, for example, electrical or optical strain transducers. Thus, for example, the front strain transducers 117, 118 and 119 can be realized as three measuring grids on a film of a film strain gage, and the rear strain transducers 121, 122 and 123 can be realized as three measuring grids on a film of a further film strain gage, or all strain transducers can be realized as Bragg gratings of optical strain gages.

A different number of strain transducers can also be provided. For example, only one strain transducer for measuring the longitudinal strain and one strain transducer for measuring the transverse strain can be applied respectively on the front side 103 as well as on the rear side 104, as is described in the EP 0 800 064 B1. The strain transducers can be circuit-connected with one another in a Wheatstone bridge circuit. Moreover, certain electronic components for further processing the signals provided by the strain transducers, such as for example amplifiers, A/D converters, etc. can be provided, whereby these can also be realized as components of an integrated circuit.

When the force transducer 101 is used for measuring the introduced force F, that is to say during a force measurement, the relationship or ratio between the transverse strain and the longitudinal strain of the deformation body 102 measured by the strain transducers 117, 118, 119, 121, 122 and 123 lies between 55% and 72%.

As can be seen in FIG. 1a and FIG. 1c, four front recesses 125', 125'', 125''' and 125'''' are provided in the front elongate recess 109, whereby in the following these together are referred to as front recesses 125. The first front recess 125' and the second front recess 125'' are arranged above the front strain transducers 117, 118 and 119 or above the front common carrier 120, and both comprise the same spacing distance to the central longitudinal axis L or the plane formed by it and the second central transverse axis Q2, that is to say they are symmetrically arranged with respect to the central longitudinal axis L or this plane. The third front recess 125''' and the fourth front recess 125'''' are arranged below the front strain transducers 117, 118 and 119 or below the front common carrier 120, and both comprise the same spacing distance to the central longitudinal axis L or to the plane formed by it and the second central transverse axis Q2, that is to say they are symmetrically arranged with respect to the central longitudinal axis L or this plane.

The first front recess 125' and the second front recess 125" on the one side, as well as the third front recess 125''' and the fourth front recess 125'''' on the other side furthermore respectively comprise the same spacing distance to the first central transverse axis Q1 or to the plane formed by it and the second central transverse axis Q2, that is to say they are symmetrically arranged with respect to the first central transverse axis Q1 or this plane.

In the rear elongate recess 110, there are provided four rear recesses 126', 126", 126''' and 126'''', which are not shown in the drawings and in the following are referred to together as rear recesses 126. These respectively lie opposite the four front recesses 125, and comprise the same shape as those. In other words, in FIG. 1*a* and FIG. 1*c* the four rear recesses 126 could also be shown, if they would be provided with other reference numbers.

The four front recesses 125 can each respectively be through-going recesses, wherein in this case they coincide with or are identical to the four rear recesses 126. The four front recesses 125 and the four rear recesses 126 can also respectively be non-through-going recesses, wherein in this case material remains between base or bottom surfaces at the bottom ends of the mutually opposite recesses. This is the case in the force transducer 101 according to the first example embodiment.

The four front recesses 125 and the four rear recesses 126 can comprise a circle shaped cross-section as shown in FIG. 1*a* and FIG. 1*c*, but can also, for example, comprise an ellipse shaped cross-section, be configured as elongated holes, or comprise other shapes. Moreover, respectively more or fewer than four recesses can also be provided, and the recesses can be differently positioned than shown in FIG. 1*a* and FIG. 1*c*.

At the upper and lower end of the deformation body 102, respectively at a transition from the flattened area of the front side 103 or of the rear side 104 to the area in which the cylindrical base shape is maintained, there is first an encircling narrow upper protrusion 127 or an encircling narrow lower protrusion 128, of which the diameter is slightly larger than both a spacing distance from the left side 105 to the right side 106 as well as a diameter of the deformation body 102 directly on the other side of the protrusions 127 and 128, which is preferably as large as this spacing distance. Following thereafter, there is an upper first section 129 or respectively a lower first section 130 with this diameter, and an upper second section 131 or respectively a lower second section 132 with a smaller diameter, whereby the upper second section 131 is terminated at its upper end by the upper end face 107 or by the force introduction surface formed by the upper end face 107, and the lower second section 132 is terminated at its lower end by the lower end face 108 or by the force introduction surface formed by the lower end face 108.

At the upper second section 131, a threading 133 can be applied as shown in FIG. 1*a* and FIG. 1*c*, or a non-illustrated other attachment means such as for example a transverse bored hole can be provided, for connecting with a force introduction device such as e.g. a weighing platform of a scale, through which the force F to be measured can be introduced. At the lower second section 132, a threading 134 can be applied as shown in FIG. 1*a* and FIG. 1*c*, or a non-illustrated other attachment means such as for example a transverse bored hole can be provided, for connecting with a force introduction device such as e.g. a base plate of a scale, through which the corresponding counter force can be introduced.

In the upper first section 129 a through-going hole 135 can be provided, which begins horizontally, then bends obliquely downwardly and finally ends below the upper protrusion 127 in an upper area of the right upper indentation 114. It serves for leading through a cable that is not illustrated in the drawings, by which the strain transducers 117, 118, 119, 121, 122 and 123 or electronic components circuit-connected after them can be connected. In this manner, the strain transducers 117, 118, 119, 121, 122 and 123 or the electronic components, even if they are hermetically encapsulated for protection against dust, moisture or other environmental influences, can be connected for example with an evaluation device and/or display device. In that regard, the encapsulation can e.g. be realized by an all-around enclosed sleeve that extends along the central longitudinal axis L approximately exactly as far as the flattened area of the front side 103 or the rear side 104.

Figure 2B:
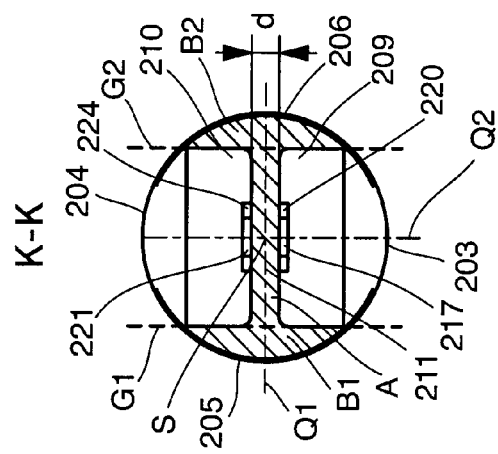
Figure 2A:
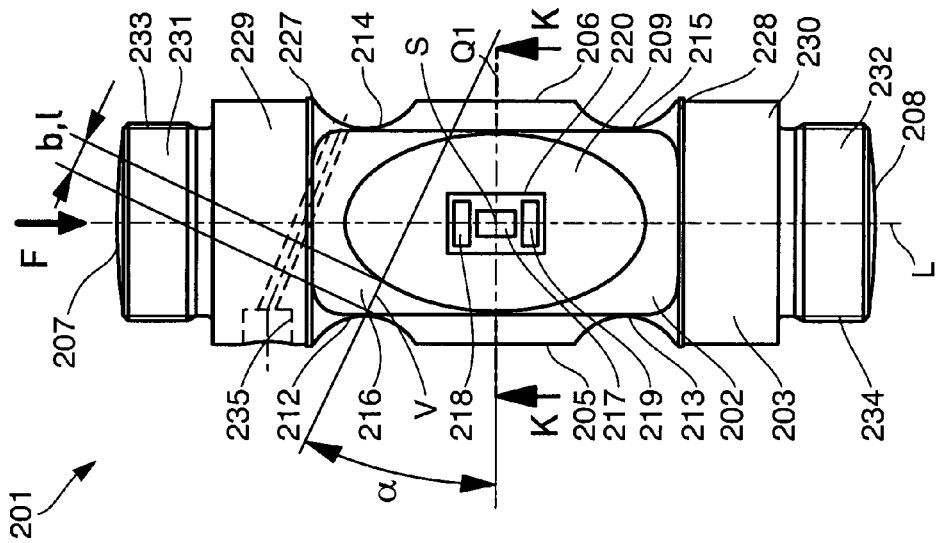

FIG. 2*a* shows a front view of the force transducer 201 according to the second example embodiment, FIG. 2*b* shows a section K-K through the force transducer 201, and FIG. 2*c* shows a perspective view of the force transducer 201.

The elements 202 to 224 and 227 to 235 correspond to the elements 102 to 124 and 127 to 135 described in connection with the first example embodiment, except for the modifications described in the following, while no elements corresponding to the front recesses 125 and the rear recesses 126 are provided in the force transducer 201 according to the second example embodiment. The modifications are necessitated by the fact that the second example embodiment proceeds from an assumption of an increased nominal load such as for example 15,000 kg.

As is recognizable in FIGS. 2*a*, 2*b* and 2*c*, the elongate recesses 209 and 210 are configured somewhat narrower than the elongate recesses 109 and 110, which pertains in equal measure for the flattened areas of the front side 203 and the rear side 204. The thickness d of the central web 211 is somewhat larger than that of the central web 111. At their upper end and their lower end, the elongate recesses 209 and 210 respectively comprise a significant spacing distance to the edge of the flattened area of the front side 203 or of the rear side 204, however at their left end and their right end they respectively go almost completely out to this edge.

The indentations 212, 213, 214 and 215 are configured somewhat less deep than the indentations 112, 113, 114 and 115 and respectively extend to the edge of the flattened area of the front side 203 and the edge of the flattened area of the rear side 204.

Figure 3C:
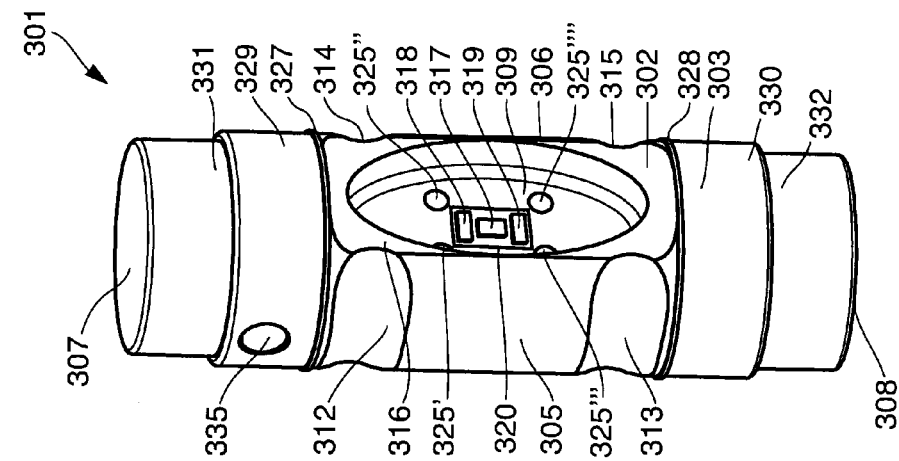
FIGS. 3a, 3b and 3c a force transducer 301 according to a third example embodiment.
Figure 3B:
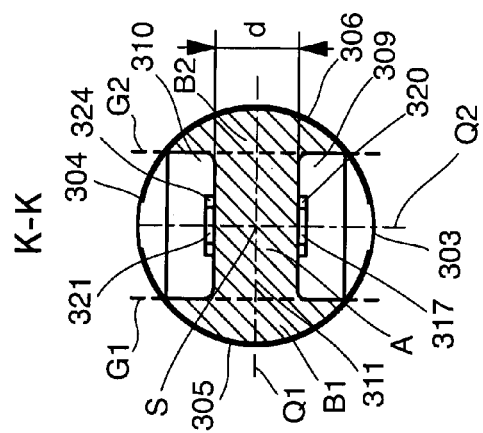
Figure 3A:
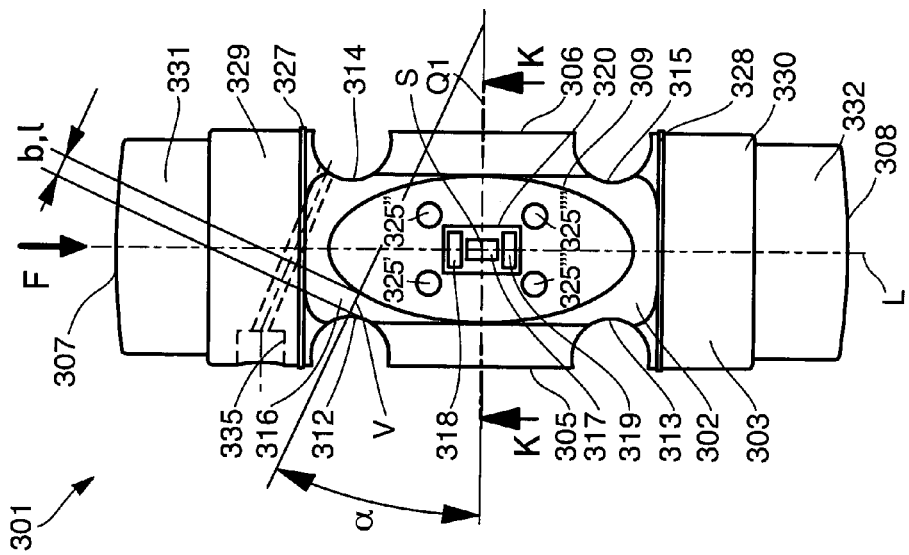

FIG. 3*a* shows a front view of the force transducer 301 according to the third example embodiment, FIG. 3*b* shows a section K-K through the force transducer 301, and FIG. 3*c* shows a perspective view of the force transducer 301.

The elements 302 to 332 and 335 correspond to the elements 102 to 132 and 135 described in connection with the first example embodiment, except for the modifications described in the following, while no elements corresponding to the upper threading 133 and the lower threading 134 are provided in the force transducer 301 according to the third example embodiment. The modifications are necessitated by the fact that the third example embodiment proceeds from an assumption of a higher nominal load such as for example 20,000 kg.

As is recognizable in FIGS. 3a, 3b and 3c, the elongate recesses 309 and 310 are configured narrower than the elongate recesses 109 and 110, which pertains in equal measure for the flattened areas of the front side 303 and of the rear side 304. The thickness d of the central web 311 is larger than that of the central web 111. At their upper end and their lower end, the elongate recesses 309 and 310 respectively comprise a significant spacing distance to the edge of the flattened area of the front side 303 or of the rear side 304, however at their left end and their right end they respectively extend out to this edge.

The indentations 312, 313, 314 and 315 are configured deeper and with a smaller radius than the indentations 112, 113, 114 and 115, but also extend into the flattened area of the front side 303 and the flattened area of the rear side 304.

The four front recesses 325 are respectively through-going recesses, and coincide with the four rear recesses 326, i.e. are identical to these.

Figure 4C:
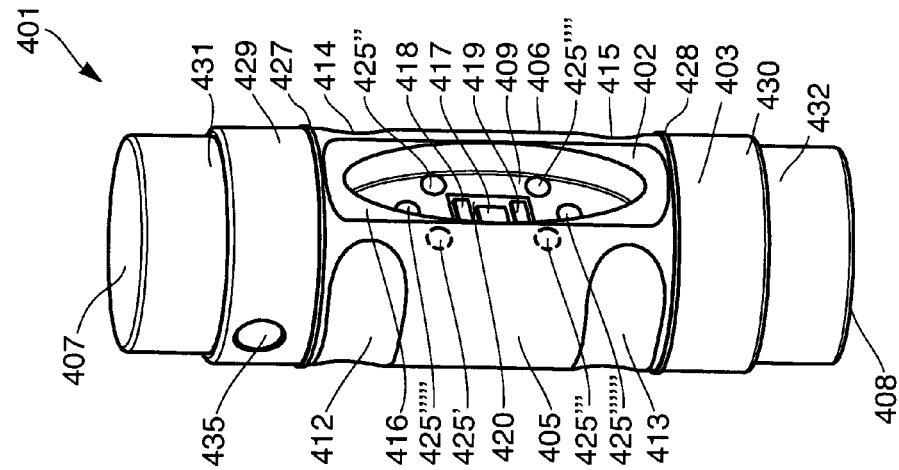
FIGS. 4a, 4b and 4c a force transducer 401 according to a fourth example embodiment.
Figure 4B:
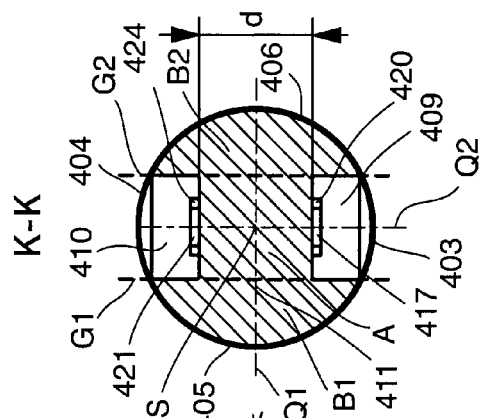
Figure 4A:
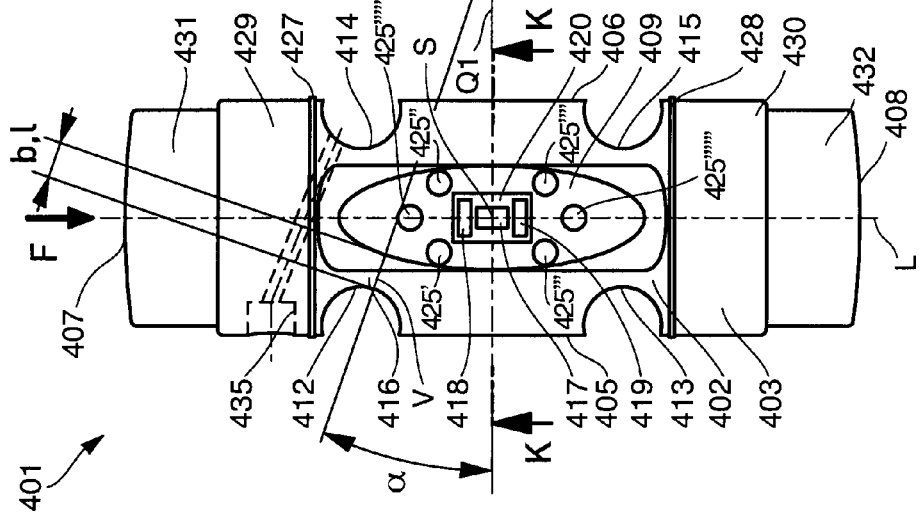

FIG. 4a shows a front view of the force transducer 401 according to the fourth example embodiment, FIG. 4b shows a section K-K through the force transducer 401, and FIG. 4c shows a perspective view of the force transducer 401.

The elements 402 to 432 and 435 correspond to the elements 102 to 132 and 135 described in connection with the first example embodiment, except for the modifications described in the following, while no elements corresponding to the upper threading 133 and the lower threading 134 are provided in the force transducer 401 according to the fourth example embodiment. The modifications are necessitated by the fact that the fourth example embodiment proceeds from an assumption of a higher nominal load such as for example 30,000 kg.

As is recognizable in FIGS. 4a, 4b and 4c, the elongate recesses 409 and 410 are configured considerably narrower than the elongate recesses 109 and 110, which pertains in equal measure for the flattened areas of the front side 403 and the rear side 404. The thickness d of the central web 411 is significantly larger than that of the central web 111. At their upper end and their lower end, the elongate recesses 409 and 410 respectively comprise a significant spacing distance to the edge of the flattened area of the front side 403 or of the rear side 404, however at their left end and their right end they respectively extend out to this edge.

The indentations 412, 413, 414 and 415 are configured deeper and with a smaller radius than the indentations 112, 113, 114 and 115. They respectively extend not completely to the flattened area of the front side 403 and the flattened area of the rear side 404.

In the front elongate recess 409, six front recesses 425', 425'', 425''', 425'''', 425''''' and 425'''''' are provided, which are referred to together as front recesses 425 in the following. The four front recesses 425', 425'', 425''' and 425'''' correspond to the four front recesses 125', 125'', 125''' and 125''''. The fifth front recess 425''''' is arranged above the first front recess 425' and the second front recess 425'' as well as centered with respect to the central longitudinal axis L. The sixth front recess 425'''''' is arranged below the third front recess 425''' and the fourth front recess 425'''' as well as centered with respect to the central longitudinal axis L. The six front recesses 425 are respectively through-going recesses and coincide with the six rear recesses 426, i.e. are identical to these.

Figure 5C:
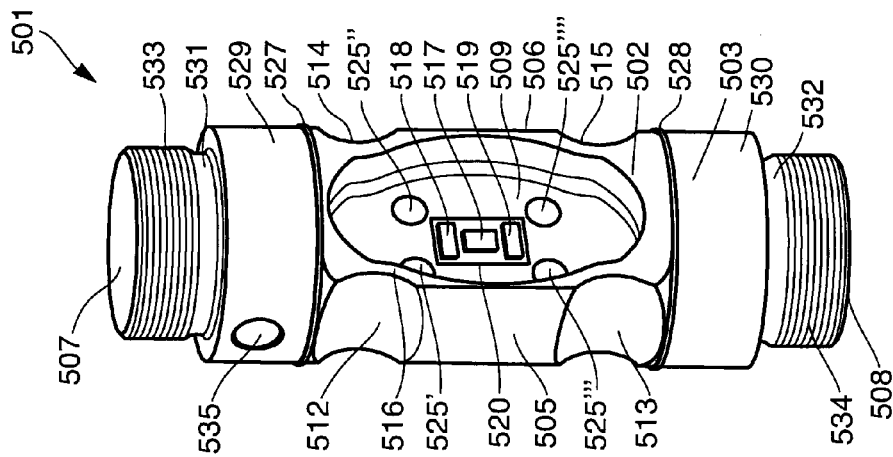
FIGS. 5a, 5b and 5c a force transducer 501 according to a fifth example embodiment.
Figure 5B:
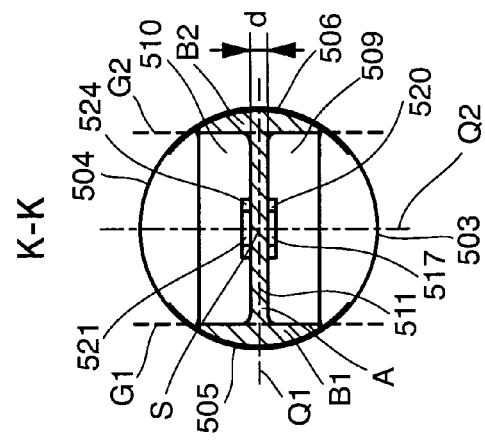
Figure 5A:
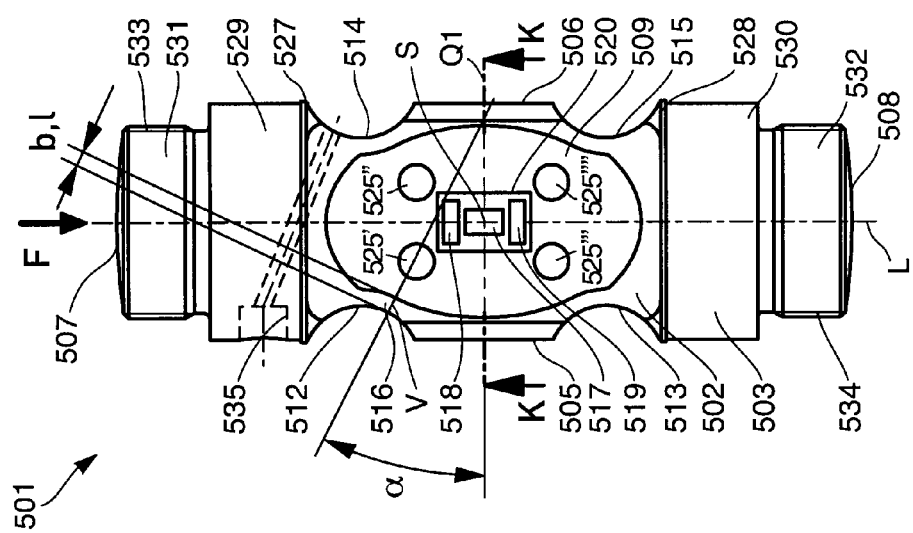

FIG. 5a shows a front view of the force transducer 501 according to the fifth example embodiment, FIG. 5b shows a section K-K through the force transducer 501, and FIG. 5c shows a perspective view of the force transducer 501.

The force transducer 501 according to the fifth example embodiment is very similar to the force transducer 101 according to the first example embodiment. The elements 502 to 508 and 511 to 535 correspond to the elements 102 to 108 and 111 to 135 described in connection with the first example embodiment. Merely the elongate recesses 509 and 510 are configured differently from the elongate recesses 109 and 110.

As is recognizable in FIGS. 5a and 5c, the elongate recesses 509 and 510 respectively expand wider again at their upper end and at their lower end. Thereby the edges or rims of the indentations 512, 513, 514 and 515 and the edges or rims of the elongate recesses 509 and 510 respectively extend parallel along a stretch, and there is not a thinnest location but rather a thinnest region with the width b on the respective web between recess and indentation. Thus, there is not exactly one shortest connecting line with a length l, which is equal to the width b of the web, between elongate recess and indentation. Therefore, for the definition of the angle α in this case, that shortest connecting line is relevant, which extends through the middle of the thinnest region with the width b. This is shown in FIG. 5a for a shortest connecting line V with the length l between the front elongate recess 509 and the left upper indentation 512.

As long as the edges or rims of the indentations 512, 513, 514 and 515 and of the elongate recesses 509 and 510 respectively extend parallel only along a short stretch, and thus the thinnest region with the width b on the respective web between recess and indentation is small, then the same positive effects arise like in the other example embodiments, if the angle α is not smaller than 17° and not larger than 29°.

The shape of the elongate recesses 509 and 510 involves one of several possible alternatives to a completely ellipse shaped configuration of the elongate recesses. In that regard, these alternatives can come into utilization not only based on the first example embodiment, but also based on the second, third or fourth example embodiment.

Further modifications of the force transducer 101 to 501 according to the first to fifth example embodiment are possible. Thus, e.g. in the force transducer 101 according to the first example embodiment, the front recesses 125 and the rear recesses 126 can also be through-going and therewith coincide. In the force transducer 201 according to the second example embodiment, elements corresponding to the front recesses 125 and the rear recesses 126 can be provided, whereby this may involve through-going or non-through-going recesses. Moreover, in all example embodiments, other numbers of the front and rear recesses are possible.

Moreover, for example in the force transducer 301 according to the third example embodiment and the force transducer 401 according to the fourth example embodiment, elements respectively corresponding to the upper threading 133 and the lower threading 134 or other attachment means can be provided. Similarly, the force transducers according to the other example embodiments can be configured without such threadings or attachment means.

Furthermore, numerous further modifications of the above described force transducers are possible, especially with respect to the explained elements of these force transducers.

In summary, the present invention relates to a force transducer for measuring compression and/or tension forces, which comprises a rod-shaped deformation body with at least a front side, a rear side, a left side, a right side, an upper end face and a lower end face as well as at least four strain transducers, which are applied on the deformation body and are configured and set-up for measuring a transverse strain and a longitudinal strain of the deformation body. A front elongate recess is provided on the front side, in the area of the intersection point between a central longitudinal axis and a central transverse axis of the deformation body. Lying opposite the front elongate recess, a rear elongate recess is provided on the rear side. On the left side, at least a left upper indentation is provided above the central transverse axis and a left lower indentation is provided below the central transverse axis. Respectively lying opposite these indentations on the left side, at least a right upper indentation and a right lower indentation are provided on the right side. A relationship or ratio of a surface area of a material cross-section in a center plane extending orthogonally to the central longitudinal axis and including the central transverse axis, to a sum of a surface area of a first partial region of the material cross-section and a surface area of a second partial region of the material cross-section, is not smaller than 1.56 and not larger than 2.15.

In the force transducer, a one-sided deformation of the deformation body can be avoided. Thereby, it can operate highly linearly and provide very accurate measurement results.

The invention claimed is:

1. A force transducer for measuring compression and/or tension forces, with:
   a rod-shaped deformation body, that comprises at least a front side, a rear side, a left side, a right side, an upper end face and a lower end face; and
   at least four strain transducers that are applied on the deformation body and are configured and set-up for measuring a longitudinal strain and a transverse strain of the deformation body, wherein:
   a front elongate recess is provided on the front side in the area of an intersection point between a central longitudinal axis and a central transverse axis of the deformation body, and lying opposite thereto a rear elongate recess is provided on the rear side,
   at least a left upper indentation is provided above the central transverse axis and a left lower indentation is provided below the central transverse axis on the left side, and respectively lying opposite these indentations at least a right upper indentation and a right lower indentation are provided on the right side,
   a material cross-section of the deformation body in a center plane extending orthogonally to the central longitudinal axis and including the central transverse axis comprises a material cross-section surface area,
   a left first partial region of the material cross-section extends from a left first line, which extends through a rim of the front elongate recess toward the left side and a rim of the rear elongate recess toward the left side, out to an edge of the material cross-section toward the left side, and comprises a first partial region surface area,
   a right second partial region of the material cross-section extends from a right second line, which extends through a rim of the front elongate recess toward the right side and a rim of the rear elongate recess toward the right side, out to an edge of the material cross-section toward the right side, and comprises a second partial region surface area, and
   a ratio between the material cross-section surface area and a sum of the first partial region surface area and the second partial region surface area is not smaller than 1.56 and not larger than 2.15.

2. The force transducer according to claim 1, wherein an angle between the central transverse axis and a shortest connecting line between the front elongate recess and the left upper indentation is not smaller than 17° and not larger than 29°.

3. The force transducer according to claim 1, wherein the elongate recesses are respectively configured with a sectional shape that is ellipse shaped.

4. The force transducer according to claim 1, wherein the indentations are respectively configured with a sectional shape that is partial circle shaped.

5. The force transducer according to claim 1, wherein:
   the front elongate recess and the rear elongate recess are respectively arranged centered with respect to the intersection point, and
   the left upper indentation and the left lower indentation as well as the right upper indentation and the right lower indentation are respectively arranged symmetrically with respect to the central transverse axis.

6. The force transducer according to claim 1, wherein at least four front recesses are provided in the front elongate recess, and respectively lying opposite thereto, at least four rear recesses are provided in the rear elongate recess, whereby these respectively can involve through-going or non-through-going recesses.

7. The force transducer according to claim 1, wherein in a force measurement, the relationship between the transverse strain and the longitudinal strain lies between 55% and 72%.

8. The force transducer according to claim 1, wherein:
   at least three front strain transducers are arranged in the front elongate recess, and at least three rear strain transducers are arranged in the rear elongate recess,
   one of the front strain transducers and one of the rear strain transducers is arranged centered with respect to the intersection point, and is configured and set-up for measuring the longitudinal strain, and
   two of the front strain transducers and two of the rear strain transducers are arranged with respect to the central transverse axis symmetrically above and below the same, and are configured and set-up for measuring the transverse strain.

9. The force transducer according to claim 1, wherein:
   the deformation body is embodied symmetrically with respect to a first plane formed by the central longitudinal axis and the central transverse axis, and
   the deformation body at least in an area in which the front elongate recess, the rear elongate recess and the indentations are located, is embodied symmetrically also with respect to a second plane extending orthogonally to the central transverse axis and including the central longitudinal axis, and is embodied symmetrically with respect to the central plane.

10. The force transducer according to claim 1, wherein the deformation body consists of steel, titanium, aluminum or beryllium copper.

11. The force transducer according to claim 1, wherein each one of the indentations is respectively a surface concavity formed on an outer surface of the deformation body.

12. The force transducer according to claim 11, wherein the surface concavity extends along the outer surface in a direction orthogonal to a plane defined by the central longitudinal axis and the central transverse axis.

13. The force transducer according to claim 1, wherein each one of the indentations is respectively a groove formed on an outer surface of the deformation body.

14. The force transducer according to claim 13, wherein the groove extends along a groove axis, the groove has a sectional shape of a first part of a circle on a section plane orthogonal to the groove axis, and the groove is outwardly open other than along the first part of the circle.

15. The force transducer according to claim 13, wherein the groove is disposed adjacent to the front elongate recess and the rear elongate recess, the groove extends along a groove axis, and the front and rear elongate recesses extend farther than the groove axis from the central transverse axis.

16. The force transducer according to claim 13, wherein the groove extends along a groove axis, and the groove axis is located outside of the deformation body at a location farther than the left or right side of the deformation body from the central longitudinal axis.

17. The force transducer according to claim 1, wherein each one of the indentations is respectively disposed adjacent to the front elongate recess and the rear elongate recess, whereby an extent of each one of the indentations overlaps with an extent of the front and rear elongate recesses with respect to distance from the central transverse axis in a plane defined by the central longitudinal axis and the central transverse axis.

18. The force transducer according to claim 1, wherein a remaining wall portion of the deformation body between the elongate recesses and the left side or the right side of the deformation body at the central transverse axis is thicker than a remaining wall portion of the deformation body between the elongate recesses and any one of the indentations.

19. The force transducer according to claim 1, wherein each one of the indentations is outwardly open in a direction radial to the central longitudinal axis and parallel to the central transverse axis.

* * * * *